United States Patent
Ma et al.

(10) Patent No.: US 6,940,617 B2
(45) Date of Patent: Sep. 6, 2005

(54) PRINTING CONTROL INTERFACE SYSTEM AND METHOD WITH HANDWRITING DISCRIMINATION CAPABILITY

(75) Inventors: Yue Ma, West Windsor, NJ (US); Jinhong Katherine Guo, West Windsor, NJ (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 908 days.

(21) Appl. No.: 09/781,529

(22) Filed: Feb. 9, 2001

(65) Prior Publication Data

US 2002/0135786 A1 Sep. 26, 2002

(51) Int. Cl.$^7$ ................................................ G06K 9/34
(52) U.S. Cl. ...................... 358/1.15; 358/462; 382/176; 382/186; 382/187; 396/313; 715/541
(58) Field of Search ................................ 382/186, 187, 382/176, 177, 179, 218; 396/313; 715/541; 358/1.1–1.9, 1.11–1.18, 2.1, 448, 452, 462

(56) References Cited

U.S. PATENT DOCUMENTS

| | | | |
|---|---|---|---|
| 4,910,787 A | | 3/1990 | Umeda et al. |
| 5,181,255 A | * | 1/1993 | Bloomberg ................. 382/176 |
| 5,631,984 A | | 5/1997 | Graf et al. |
| 6,011,635 A | * | 1/2000 | Bungo et al. ............... 358/488 |
| 6,043,823 A | * | 3/2000 | Kodaira et al. ............. 345/619 |
| 6,567,548 B2 | * | 5/2003 | Nathan et al. .............. 382/186 |

OTHER PUBLICATIONS

Violante, S., Smith, R. and Reiss M.: A Computationally Efficient Technique for Discriminating Between Hand–written and Printed Text, IEEE Colloquium on Document Image Processing and Multimedia Environments, pp. 17/1–17/7, 1995.

Rabiner. L.R., A tutorial on Hidden Markov Models and selected applications in speech recognition. Proceedings of the IEEE, 77:257–286, 1992.

Sin, B.K. and Kim, J.H., A statistical approach with HMMs for on–line cursive Hangul (Korean script) recognition. In Proceedings of the International Conference on Document Analysis and Recognition, pp. 147–150, 1993.

Pal, U. and Chaudhuri, B.B., Automatic Separation of Machine–printed and Hand–written Text Lines, Proceedings of the 5th ICDAR, pp. 645–648, 1999.

Chen, F.R., Wilcox, L.D. and Bloomberg, D.S., Detecting and locating partially specified keywords in scanned Images using Hidden Markov Models. In Proceedings of the International Conference on Document Analysis and Recognition, pp. 133–138, 1993.

Hoenes, F. and Lichter. J., Text string extraction within mixed–mode documents. In Proceedings of the International Conference on Document Analysis and Recognition, pp. 655–659, 1993.

Park, H. S. and Lee, S. W., Off–line recognition of large–set handwritten hangul with hidden markov models. In Proceedings of the International Workshop on Frontiers in Handwriting Recognition, pp. 51–61, 1993.

* cited by examiner

Primary Examiner—King T. Poon
(74) Attorney, Agent, or Firm—Amster, Rothstein & Ebenstein LLP

(57) ABSTRACT

A system and method for identifying and separating handwritten text from machine printed text in a document having a combination of handwritten text and machine printed text. In one embodiment, the present invention is installed as an intelligent printing control interface in a conventional computer and allows any document generated by any application to be selectively processed to remove any handwritten text prior to printing of the document, under the control of the user. In an alternative embodiment, the present invention is installed as an intelligent printing control interface in a conventional digital copy machine, which allows any document being copied to be selectively processed to remove any handwritten text prior to printing of the document, under the control of the user. The present invention employs a handwriting separation method which uses Hidden Markov Models to identify regions as either handwritten text or machine printed text.

10 Claims, 10 Drawing Sheets

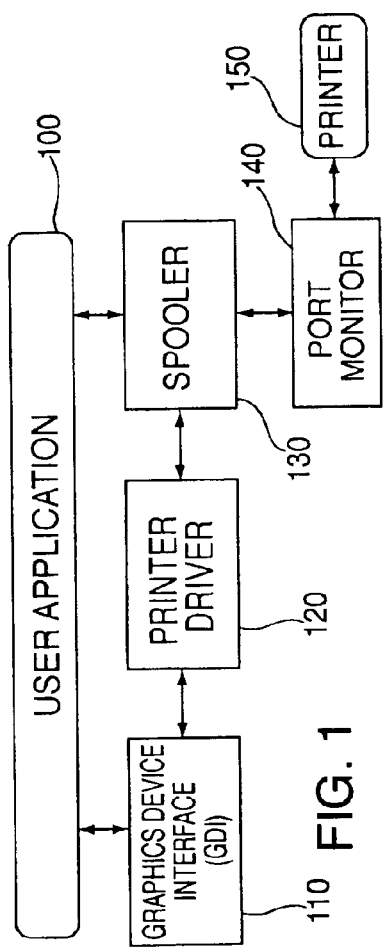
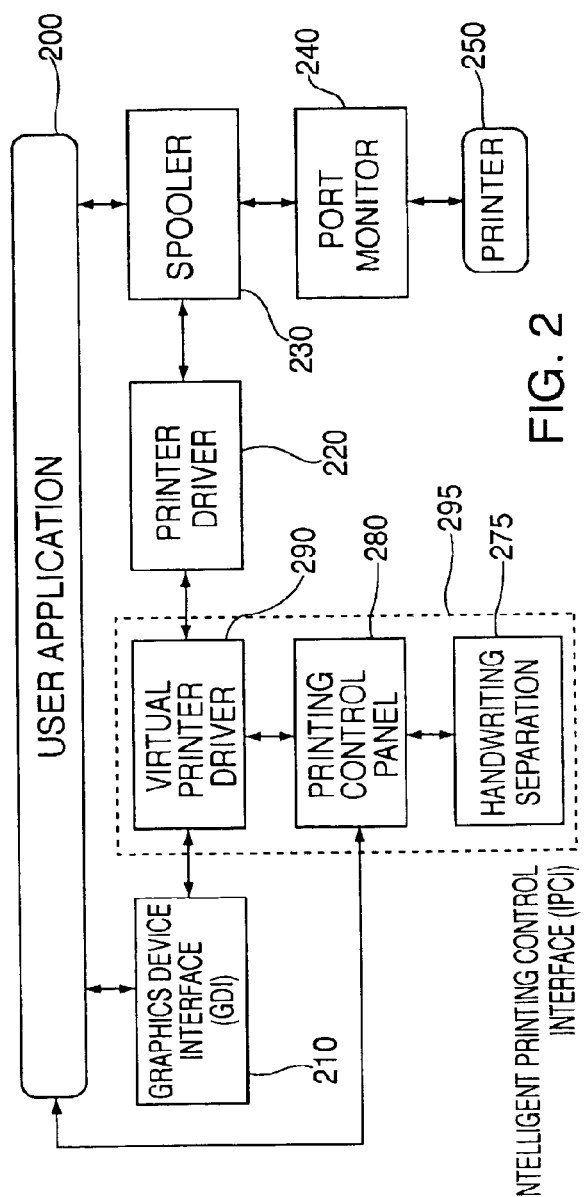

FIG. 7

Detecting and Utilizing Add-on Information
From a Scanned Document Image

Matthew Ma and Katherine Guo
*Panasonic Information and Networking Technologies Laboratory*
*Panasonic Technologies, Inc.*
*Two Research Way*
*Princeton, NJ 08540, USA*
[mma,kguo]@research.panasonic.com PINTL-IM-142-099   ← *register*
March 27, 2000

Abstract

*A method for detecting and separating add-on handwritten annotations from a scanned document image is presented. This method combines the projection histogram and line merge techniques in order to discriminate between printed text lines and handwritten annotations. The example shows that it works with simple text documents with handwritten annotations on margin areas or white space within the main text. The algorithm, however, can be extended in order to handle more complex scenarios.* *Please expand.*

Keywords: Handwritten annotation detection, Handwritten annotation separation, Scanned image, Projection histogram, Connected component, Line merge.

FIG. 9

Detecting and Utilizing Add-on Information
From a Scanned Document Image

Matthew Ma and Katherine Guo
Panasonic Information and Networking Technologies Laboratory
Panasonic Technologies, Inc.
Two Research Way
Princeton, NJ 08540, USA
{mma,kguo}@research.panasonic.com PINTL-IM-1142-099 ← register
March 27, 2000

Abstract

A method for detecting and separating add-on handwritten annotations from a scanned document image is presented. This method combines the projection histogram and line merge techniques in order to discriminate between printed text lines and handwritten annotations. The example shows that it works with simple text documents with handwritten annotations on margin areas on white space within the main text. The algorithm, however, can be extended in order to handle more complex scenarios. *Please expand.*

Keywords: Handwritten annotation detection, Handwritten annotation separation, Scanned image, Projection histogram, Connected component, Line merge.

Detecting and Utilizing Add-on Information
From a Scanned Document Image

Matthew Ma and Katherine Guo
*Panasonic Information and Networking Technologies Laboratory*
*Panasonic Technologies, Inc.*
*Two Research Way*
*Princeton, NJ 08540, USA*
[mma,kguo]@research.panasonic.com

925

PINTL-IM-142-099
March 27, 2000

Abstract

930

*A method for detecting and separating add-on handwritten annotations from a scanned document image is presented. This method combines the projection histogram and line merge techniques in order to discriminate between printed text lines and handwritten annotations. The example shows that it works with simple text documents with handwritten annotations on margin areas or white space within the main text. The algorithm, however, can be extended in order to handle more complex scenarios.*

Keywords: Handwritten annotation detection, Handwritten annotation separation, Scanned image, Projection histogram, Connected component, Line merge.

FIG. 11

PRINTING CONTROL INTERFACE SYSTEM AND METHOD WITH HANDWRITING DISCRIMINATION CAPABILITY

FIELD OF THE INVENTION

The invention relates generally to a system and method for processing images having a mixture of machine printed text and handwritten annotations to remove such handwritten notations.

BACKGROUND OF THE INVENTION

It is common for a document that has been sent to a printer and/or placed in a copier for copying to contain a mixture of contents, i.e., machine-printed text and add-on information overlaid over the original contents. Examples of add-on information include handwritten notes, signatures, stamps, etc. (collectively "handwritten annotations"). In many cases, a user may intentionally want to print only the original contents, e.g., a letter for review without handwritten notes. However, until now it has been difficult to print such documents without including the annotations.

In a conventional computer system, as shown in FIG. 1, most printing jobs from a user application 100 are performed through a graphics device interface (GDI) 110, a printer driver 120, and a print spooler 130. In this method, an application 100 creates a document and outputs a print request. GDI 110 is an operating system component, which converts graphic calls to a format that the printer drivers understand. GDI 110 receives requests from the various user applications and sends these requests to the corresponding driver of the printer chosen by the application. From an application's point of view, there are no differences among the various printers, which simply appear as output devices. GDI 110 supports text, bitmap and graphics rendering (i.e., drawing lines, curves arcs, rectangles and color fill). This printing methodology allows applications 100 to send device independent printing commands to render text and graphics. These printing commands are then sent to printer driver 120 via GDI 110. Printer driver 120 converts the standard graphics request to those commands that a printer understands and send them to spooler 130 Finally, a printer receives the printing commands through spooler 130 and port monitor 140. Spooler 130 manages the print jobs and allocates resources for printing from the computer's CPU without interrupting any current operation. Likewise, conventional digital copying machines include similar subsystems, albeit in a more closed environment where the subsystems are fixed and not generally accessible to the user.

The prior art is limited in its ability to remove handwritten annotations from a document having machine printed text and annotations. In a first method, a marker or template is placed on the document being processed to assist in locating the handwritten annotation, see e.g., U.S. Pat. No. 5,631,9084 which places a magnetic ink character recognition line on a bank check for use in locating the handwritten signature. The first method requires special apparatus to locate the marker or template. In a second method, handwritten annotations are identified and separated from machine printed text for separate processing. However, the prior art is limited in its ability to handle complex cases where a document contains a mixture of machine printed text and handwritten annotations, and where the handwritten annotations are mixed with the machine printed text, i.e., where the handwritten annotations do not appear only in regions of white space in the original document such as margins.

Hidden Markov Models (HMM) have use in many applications. One of the most successful applications is speech recognition, but it has also been applied to optical character recognition and keyword identification. In summary, as an overview of HMM theory, it is important to note that in natural language, there is an embodied Markovian structure. For example, the probability of seeing a letter "u" after letter "q" is usually greater than seeing "u" after any of the other letters. A process that has a property that the conditional probability of a current event giving past and present events depends only on the most recent event is a Markov process. In a discrete Markov process, each state corresponds to an observable deterministic event. But in a Hidden Markov Model, the output of each state corresponds to an output probability distribution. The method of the present invention is based on the theory of Hidden Markov Models (HMM). The unknown OCR knowledge is treated as hidden states and a decision is made based upon the observation sequences that come from these states.

It is therefore an object of the present invention to provide a system and method for the automatic separation of handwritten annotations from machine printed text.

It is an additional object of this invention to provide a system and method for the automatic separation of handwritten annotations from machine printed text that is based on a Hidden Markov Model.

It is a further object of this invention to provide a system and method for the automatic separation of handwritten annotations from machine printed text embodied within a conventional digital copy machine.

It is another object of this invention to provide a method for the automatic separation of handwritten annotations from machine printed text within documents sent for printing on a conventional printer.

Various other objects, advantages and features of the present invention will become readily apparent from the ensuing detailed description and the novel features will be particularly pointed out in the appended claims.

SUMMARY OF THE INVENTION

These and other objectives are realized by the present invention, which is a system and method for printing or copying documents having a mixture of handwritten text and machine printed text such that the printed document contains only machine printed text. In particular, the first embodiment of the present invention comprises means for generating digital documents having handwritten text and machine printed text and for generating a request to print at least one of the digital documents, an intelligent printing control interface connected to the means for generating which receives the request and selectively processes the request to remove the handwritten text, and means connected to the intelligent printing control interface for printing the selectively processed request. The intelligent printing control interface further comprises a virtual printer driver for receiving the request, a printing control panel for determining whether to process the request, and a handwriting separation module for selectively processing the request, under control of the printing control panel, to remove the handwritten text. Further, the handwriting separation module processes the request by segmenting the digital image into a plurality of text blocks, computing an observation sequence for each of the text blocks, computing a first probability for each of the text blocks that the observation sequence would appear in a predetermined Hidden Markov Model for machine printed text, computing a second probability for each of the text blocks that the observation sequence would appear in a predetermined Hidden Markov Model for handwritten text, comparing the first probability and the second probability for each of the text blocks, marking the text block as machine printed text if the first probability is greater than the second probability, marking the text block as handwritten text if the second probability is greater than the first probability, and removing the marked handwritten text.

In an alternative embodiment, the present invention comprises a system for copying documents, comprising a scanner for generating a digital document having handwritten text and machine printed text and for generating a request to print the digital document, an intelligent printing control interface connected to the scanner which receives the request and selectively processes the request to remove the handwritten text, and a printer connected to the intelligent printing control interface for printing the selectively processed request.

The present invention also comprises a method for separating handwritten text from machine printed text in a digital image containing a mixture of handwritten text and machine printed text comprises the steps of segmenting the digital image into a plurality of text blocks, computing an observation sequence for each of the text blocks, computing a first probability for each of the text blocks that the observation sequence would appear in a predetermined Hidden Markov Model for machine printed text, computing a second probability for each of the text blocks that the observation sequence would appear in a predetermined Hidden Markov Model for handwritten text, comparing the first probability and the second probability for each of the text blocks, marking the text block as machine printed text if the first probability is greater than the second probability, and marking the text block as handwritten text if the second probability is greater than the first probability. The handwriting separation method of the present invention further comprises the step of post-processing the digital image after each of the text blocks are marked as either machine printed text or handwritten text to correct single errors.

In particular, the segmenting step of the handwriting separation method comprises the steps of generating connecting components within the digital image, and grouping the connected components into a plurality of text blocks. Further, the grouping step of the handwriting separation method comprises the steps of determining if each pair of neighboring connected components are on the same line, then for a given pair of neighboring connected components on the same line, determining if the pair of neighboring connected components are adjacent to each other. Next, for a given pair of neighboring connected components adjacent to each other, the method determines if the pair of neighboring connected components have the same height, and if the pair of neighboring connected components have the same height, the pair of neighboring connected components are merged together into a single text block.

BRIEF DESCRIPTION OF THE DRAWINGS

The following detailed description, given by way of example and not intended to limit the present invention solely thereto, will best be understood in conjunction with the accompanying drawings in which:

FIG. 1 is a diagram demonstrating how a conventional computer processes a print request;

FIG. 2 is a diagram showing the elements of the intelligent printing control interface of the present invention embodied in a computer system;

FIG. 7 is a machine printed text training sheet for use in the handwriting separation method of the present invention;

FIG. 9 is a sample document having a mixture of handwriting and machine printed text;

FIG. 10 is a document showing the output of the machine text identification step of the handwriting separation method of the present invention; and FIG. 11 is a document showing the output of the handwritten text identification step of the handwriting separation method of the present invention.

DETAILED DESCRIPTION OF THE PREFERRED EMBODIMENTS

Figure 3:
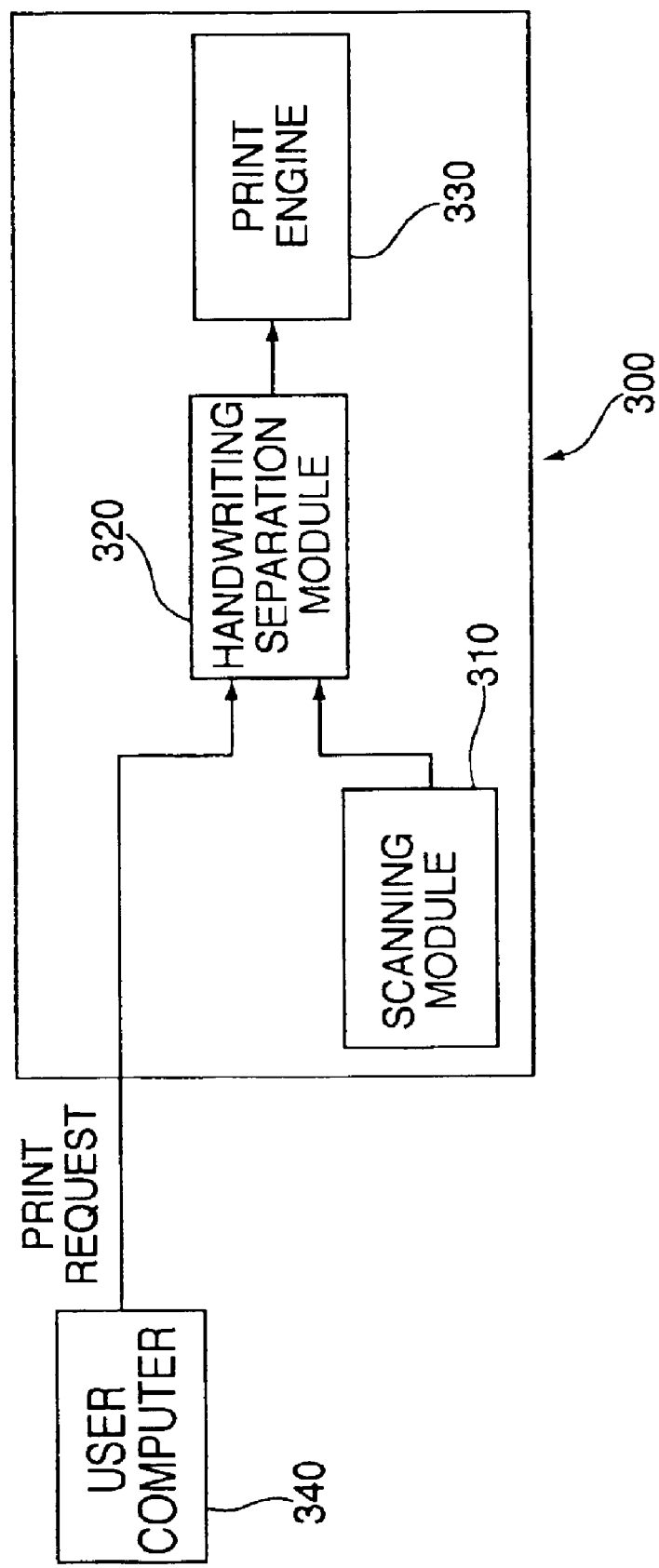
FIG. 3 is diagram of the intelligent printing control interface of the present invention embodied in a printer/copier system.

Referring now to the drawings and in particular FIG. 2, an intelligent printing control interface (IPCI) 295 is configured to create a printing/copying device having special image processing functions, i.e., the capability to separate handwritten annotations. This printing/copying device may be implemented within a general purpose computer system or within a dedicated printer/copier. IPCI 295 includes a virtual printer driver 290, a printing control panel 280 and a handwriting separation module 275. When a document generated by a user application 200 is to be printed, printing commands associated with that document are passed to graphics device interface (GDI) 210. GDI 210 conventionally processes those commands and passes them to IPCI 295 (instead of printer driver 220). IPCI 295, under the control of printing control panel 280, processes the printing commands to remove any handwritten annotations in the document, and passes the processed printing commands to printer driver 220 for printing in a conventional manner using spooler 230, port monitor 240 and printer 250, in the same manner as described above with respect to the first embodiment. Two types of documents are contemplated: (1) scanned documents having handwritten annotations added to an original document after being printed; and (2) a digital document having handwritten annotations generated using an on-line annotation tool.

When installed in a computer system, IPCI 295 may be installed so that its operations are known to the user (i.e., the IPCI "aware" mode) or so that its operations are invisible to the user (i.e., the IPCI "blind" mode). In the "aware" mode, the user must select a dedicated "IPCI Printer" to take advantage of the handwriting separation capabilities. In the "blind" mode, the user selects any of the available printers and then configures the handwriting separation capabilities using the printer preferences for the selected printer.

As discussed above, virtual printer driver 290 accepts print commands from GDI 210 and passes them to the destination device (i.e., third party printer driver 220, spooler 230, port monitor 240 and printer 250). In addition, virtual printer driver 290 removes handwritten annotations in the document being printed. For speed of performance and to simplify implementation, this is done by overlaying the original document content with a blank bitmap at detected handwriting regions.

Alternatively, as shown in FIG. 3, the handwriting separation method of the present invention may be implemented in a special purpose computer within a dedicated printer/copier 300 (e.g., a digital copy machine or a multi-function peripheral). Dedicated printer/copier 300 includes a scanning engine 310, a handwriting separation module 320, and a printing module 330. In operation dedicated printer/copier 300 has two modes of operation. In the first mode (i.e., the "print mode"), a print request is generated by an external user at an external computer 340 and sent to dedicated printer/copier 300. The print request is supplied to handwriting separation module 320 for processing to remove any handwritten annotations, and then the modified print request is supplied to print engine 330 for printing. In the second mode (i.e., the "copy mode"), a document is scanned using scanning module 310 and the resulting digital image is supplied o handwriting separation module 320 for processing to remove any handwritten annotations. Then the modified scanned image is supplied to print engine 330 for printing.

Figure 4:
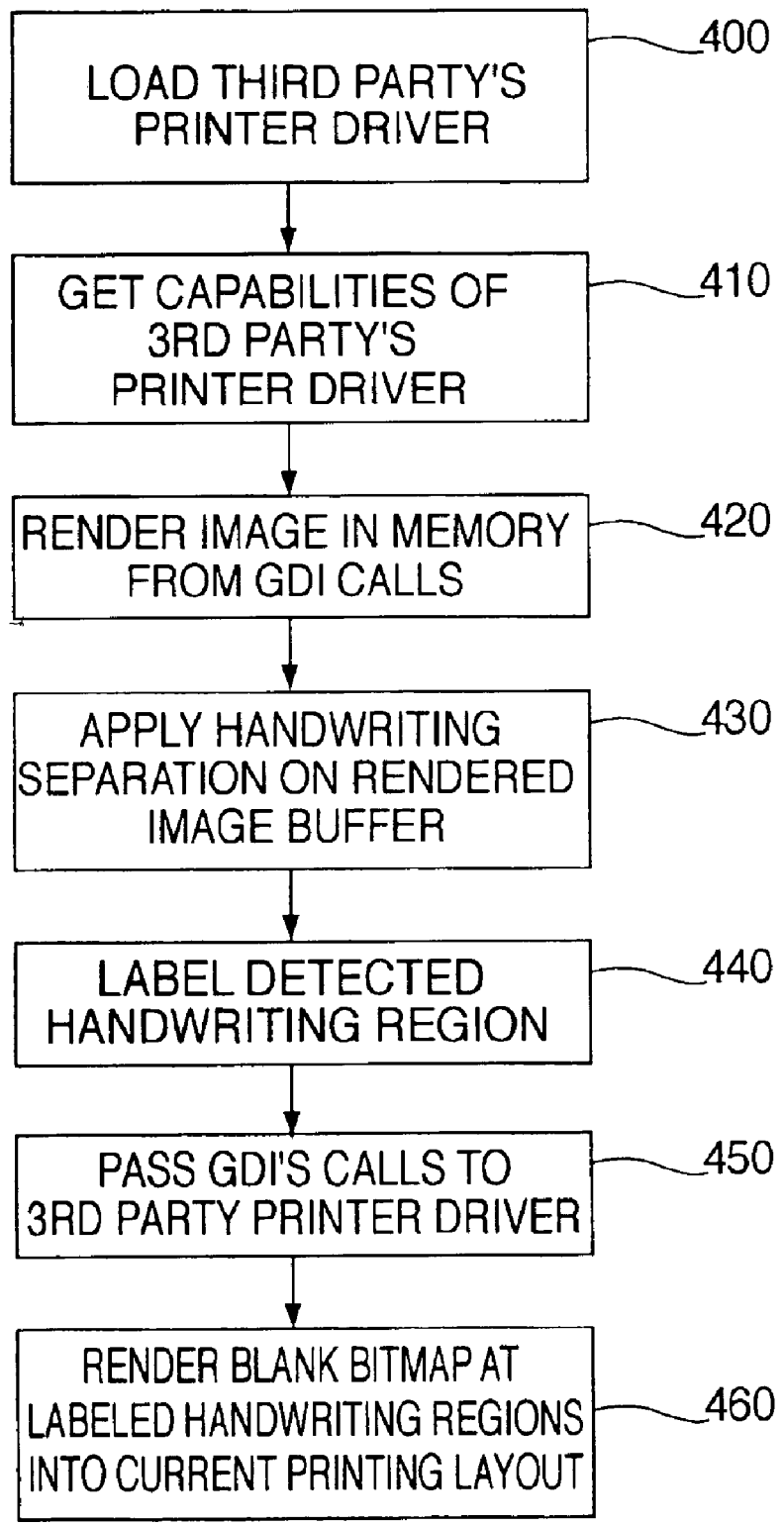
FIG. 4 is a flowchart showing the operational steps of the present invention.

FIG. 4 is a flowchart of the steps performed by virtual printer driver 290 to remove the annotations. For both types of documents generated by a user application(i.e., scanned or digitally generated), the process of removing the handwritten annotations is the same, the image is simply printed using either an IPCI Printer ("aware" mode) or any one of the possible printers ("blind" mode). As shown in FIG. 4, the first step is to load the third party's printer driver (step 400), and obtain the capabilities of that printer driver (step 410). Next, the image to be printed is rendered in memory using the information obtained from GDI 210 (FIG. 2) (step 420). At step 430, the handwriting separation algorithm discussed in detail below is applied to the image in memory, and, at step 440, all of the regions which include handwriting are identified. Then, the original information obtained from GDI 210 is passed to third party printer driver 220, without any change (step 450). Finally, blank bitmaps are rendered at each of the identified regions containing handwriting, and this additional information is passed to third party printer driver 220 (step 460), which causes the handwritten annotations to be masked out during printing.

User interface control panel 280 provides a user an interface to configure the operation of IPCI 295 when necessary. For example, a user may want to enable or disable the handwriting separation capability of the system. When used in conjunction with a computer system, user interface control panel 280 can be an add-on property sheet to an existing third party printer user interface. It can be invoked when configuring an IPCI printer (i.e., in the "aware" mode), or configuring the operation of any third party printers with IPCI installed (i.e., the "blind" mode). When used in conjunction with a printer/copier system, user interface control panel 280 is controlled through the user interface of the system in a conventional manner (e.g., the printer/copier includes configuration menus that are accessed through a display screen and a keypad/mouse or a touchscreen interface).

Figure 5A:
FIG. 5A is a projection profile for the machine printed letter "M" and FIG. 5B is a projection profile for the handwritten letter "M"
Figure 5B:
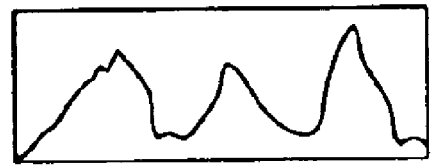

To identify handwritten annotations, the statistical variations of appropriate features are considered. The projection profile for a letter is defined as a vertical projection of image pixels within its bounding box. Examples of projection profiles are shown in FIGS. 5A and 5B. Machine printed text produces a large number of regularities on a projection profile because of regularities in machine printed text. On the other hand, handwritten annotations tend to vary by style and appear irregularly, therefore, their projection profile is smoother. The difference between the projection profiles of machine printed text and handwritten annotations are demonstrated by a comparison of FIGS. 5A and 5B. FIG. 5$a$ shows a projection profile for the machine printed letter "M" that includes steep and abrupt changes in magnitude, while FIG. 5B shows a projection profile for the handwritten letter "M" that includes more gradual changes in magnitude. Discrimination is performed at the word level, since it is not necessary to descend to the character level because a single word (or string) is typically uniform with respect to style. The method of the present invention is based on the theory of Hidden Markov Models (HMM). The unknown OCR knowledge is treated as hidden states and a decision is made based upon the observation sequences that come from these states.

When analyzing a projection profile, for example, if the projection along neighboring characters is computed, the changes in projection along the neighboring characters in a machine printed character can be considered as a Markov chain. However, since a similar projection profile may arise from one of a large number of letters, it is not possible to simply use Markov models. In a hidden Markov model, the observation is a probabilistic function of the state. The HMM is a doubly embedded stochastic process with an underlying stochastic process that is hidden, namely the identity of the character.

For example, let N be the number of states in the model and M the number of distinct observation symbols per state. A is the state transition probability matrix, where $$a_{ij}=P[q_{t+1}=S_j|q_t=S_i], 1 \leq i,j \leq N \quad (1)$$

so that $a_{ij}$ is the probability that state $S_i$ at time t change to state $S_j$ at time t+1. B is the observation symbol probability matrix, where $$b_j(k)=P[v_k \text{at } t|q_t=S_j], 1 \leq j \leq N, 1 \leq k \leq M \quad (2)$$

$b_j(k)$ is the probability that one observes symbol $v_k$ at time t given that the state is $S_j$ at time t. π is the initial state distribution, i.e., $$\pi_i=P[q_1=S_i], 1 \leq i \leq N \quad (3)$$

is the probability of being at state $S_i$ at time t=1.

Given the observation sequence $O=O_1O_2 \ldots O_T$ and the Markov model $\lambda=A, B, \pi$, the probability $P(O|\lambda)$ is to be computed. The procedure used is the so-called Forward-Backward Procedure. If the forward variable is set as $a_t(i)=P(O=O_1O_2 \ldots O_t, q_t=S_i|\lambda)$, i.e., $a_t(i)$ is the probability of the partial observation sequence, $O=O_1O_2 \ldots O_t$ (until time t) and the state at t is $S_i$, given the model λ. The forward procedure is as follows:

1. Initialization $$\alpha_1(i)=\pi_i b_i(O_1), 1 \leq i \leq N \quad (4)$$

2. Induction $$\alpha_{t+1}(j) = \left[\sum_{i=1}^{N} \alpha_t(i) a_{ij}\right] b_j(O_{t+1}), 1 \leq t \leq T-1, 1 \leq j \leq N \quad (5)$$

3. Termination $$P(O|\lambda) = \sum_{i=1}^{N} \alpha_T(i) \quad (6)$$

From induction, it is clear that $a_t$ decreases as t increases. If the observation sequence is too long, the a would go beyond the capacity of the machine. So scaling is applied in real application. Although not discussed in specific detail here, scaling within a Hidden Markov Model is well understood to one of ordinary skill in the art.

The handwriting separation method of the present invention relies on the identification and segmentation of text blocks in the image in order for HMM to work on the word level. A number of algorithms for segmentation of text blocks are known to those of ordinary skill in the art. However, in the present invention, connected components are first generated. Then, a simple grouping method is used, as follows: Given two connected components represented by their bounding boxes (x1_min, x1_max, y1_min, y1_max) and (x2_min, x2_max, y2_min, y2_max) respectively, where x represents the horizontal coordinates and y represents the vertical coordinates in a coordinate system where the origin is in the upper left corner, (x_min, y_min) represent top left corner of the bounding box and (x_max, y_max) represent the lower right corner. The following three conditions are checked:

1. Is |y1_min−y2_min| is less than a pre-defined threshold T0?
2. Is |x1_max−x2_min| or |x2_max−x1_min| less than a pre-defined threshold T1?
3. Is |(y1_max−y1_min)−(y2_max−y2_min)| less than a pre-defined threshold T2?

The first condition is for grouping bounding boxes on the "same" line. The second condition is for adjacency and the third ensures that two bounding boxes have the "same" height. Here, "same" stands for a certain degree of closeness, which is set by the predetermined thresholds T0, T1, and T2. If the above conditions are met, the two components are merged and the resulting coordinates of the newly merged box become:

x_min=min(x1_min, x2_min)

x_max=max(x1_max, x2_max)

y_min=min(y1_min, y2_min)

y_max=max(y1_max, y2_max)

In segmentation, small components (e.g., a dash) are eliminated before grouping.

At the word level, a segmented word may consist of several individual letters that are represented by bounding boxes. An observation sequence is obtained at the word level by concatenating projection profiles from individual letters that are within the word.

In the model used for the handwriting separation method of the present invention, B62 hidden states are used that correspond to the B52 upper and lower case Latin characters and to the 10 numerical digits, and 10 symbols are used which correspond to 10 levels of projection values in observation sequences. Thus, the states are the unknown letters and the observation sequence is a probabilistic function of the states. In this model, element $a_{ij}$ of the state transition probability matrix A is the transition probability between two neighboring letters within a word; i.e., element $b_j$ of B is the probability of a symbol occurring in a given letter or digit, and element $\pi_i$ of $\pi$ is the probability that the word starts with that letter or digit.

Figure 6:
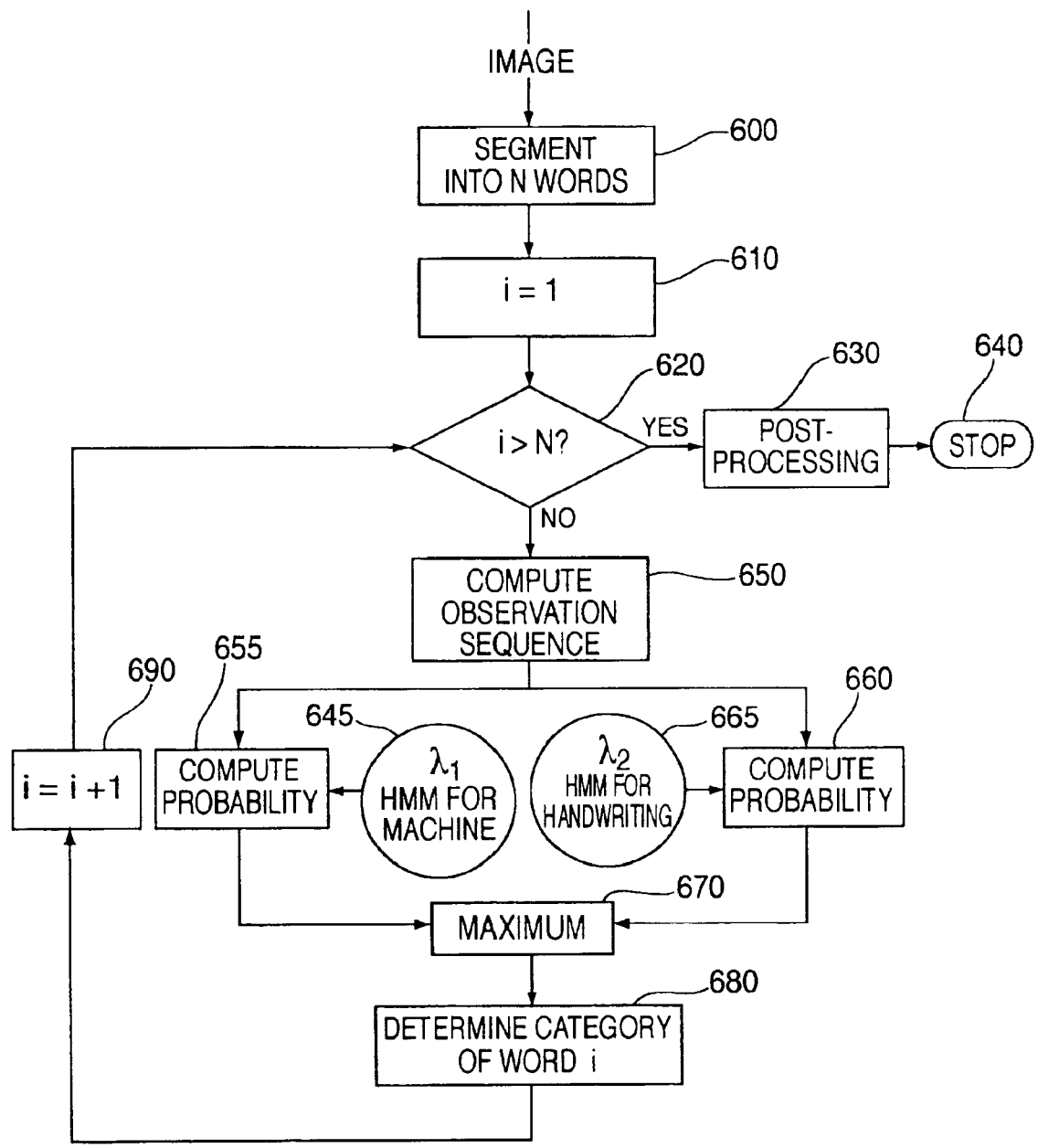
FIG. 6 is a flowchart of the handwriting separation method of the present invention.

FIG. 6 is a flowchart demonstrating the classification process of the handwriting separation method of the present invention. An image is first segmented into N text strings (words) as discussed above (step 600). An index i is initialized to 1 (step 610). Then, processing loops for each word, under the control of decision box 620 and index increment step 690. During each processing loop, the projections of each letter within a word are computed and concatenated to generate the observation sequence of that word (step 650). Of course, as one of ordinary skill will readily recognize, there are numerous other ways of computing an observation sequence for a word. Next, the probabilities of observing the sequence given the models ($P(O|\lambda)$) are computed for each word given a particular model, currently machine printed text (steps 645 and 655) or handwritten text (steps 660 and 665). The model that yields the highest probability is selected as the result (steps 670 and 680). As evident, two models are generated for classification: (1) a machine model or (2) a handwriting model. The method used to obtain hidden Markov models is described below. Once all of the identified words are classified, a post-processing step 630 is utilized in order to improve the accuracy, as described below, and thereafter processing ends (step 640).

Once all words within the document are classified independently from the HMMs, some error may remain, i.e., handwritten text may be classified as machine printed text and vice versa. Thus, in handwritten annotation method of the present invention, post-processing may optionally be applied to correct single errors, based on the majority of classification results. First, for each classified word, three numbers are computed, as follows:

1. MN—the number of machine words that are in its neighbor (mainly left and right sides);
2. HN—the number of handwritten words in its neighbor; and
3. ML—the number of machine words that are approximately on the same line.

The following rules are then developed based on the values of MN, HN, and ML:

1. If current word is classified as handwriting, it resides along a machine printed text line (ML>1) and there is at least one machine word neighbor (MN>0), reverse current word to "machine printed text".
2. If current word is classified as machine printed text, and if two or more handwriting words are in its neighbor (HN>1), reverse to "handwritten annotation". If the current word is residing along a machine text line (ML>1) and there is at least a machine neighbor (MN>0), it remains "machine printed text". If the current word has one handwriting word neighbor (HN=1), and one or zero machine word neighbor (MN<=1), it is difficult to decide and mark the current word as "unknown".

In all other cases considered during postprocessing, the status of the word being considered remains the same.

Figure 7:
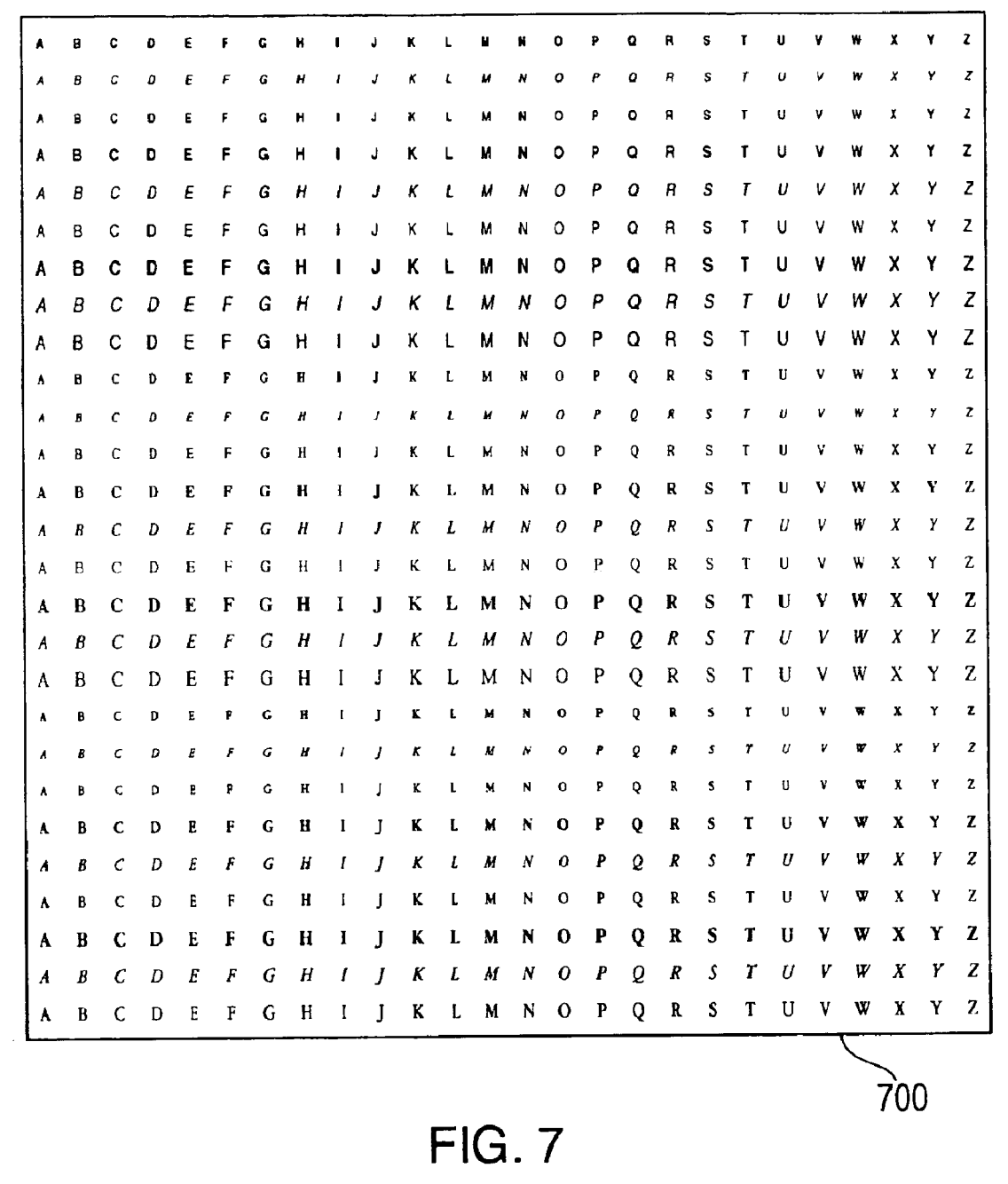
Figure 8:
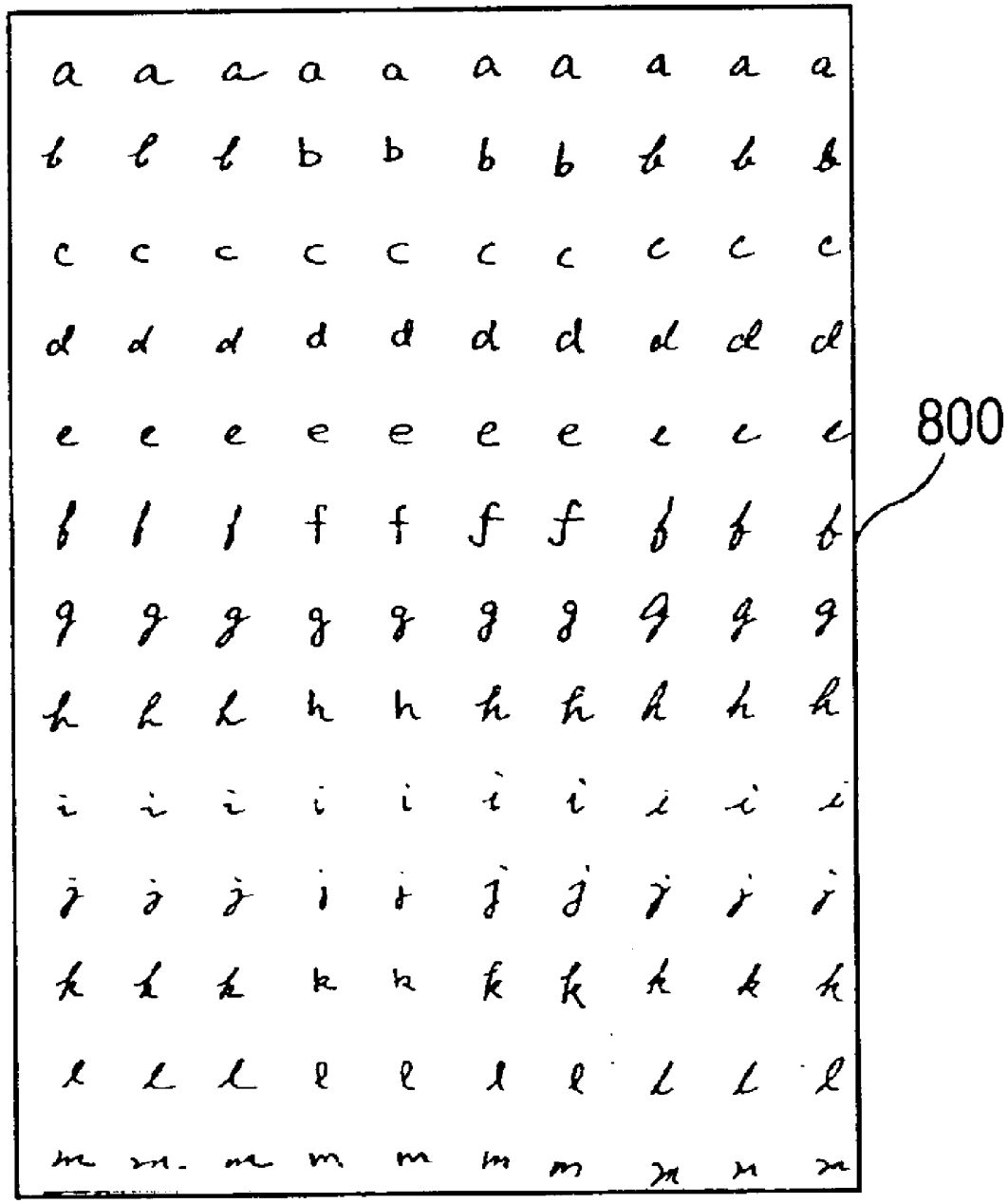
FIG. 8 is a handwritten text training sheet for use in the handwriting separation method of the present invention.

Training is used to obtain the HMM model for machine printed text ($\lambda_1$) and handwritten text ($\lambda_2$). The computation of models can be done only once in the training process. In training, the probability matrices A and $\pi$ are obtained from samples of ASCII text. The matrix B is computed from a set of scanned bitmap images of various styles of letters and digits. The matrices A and $\pi$ are the same for both machine and handwriting models. Matrix B has to be computed separately for machine and handwriting. FIGS. 7 and 8 depict samples of training matrices B for machine text and handwritten annotations, respectively.

In training Matrix B, several samples of the same letter (state) are obtained. For every sample of each letter, an observation sequence is calculated and the probability is computed on an averaging basis. As seen in FIG. 7, several font styles are used for each machine printed letter (state). For handwritten letters, samples from different users should be collected for each handwritten letter, as seen in FIG. 8. The use of multiple samples takes into account the various font styles for machine printed text and the individuals differences in handwriting. The selection of large training samples will ensure the invariance of our discriminator over various document styles and different writers. In addition, the method of computing the observation sequence is font size independent. All training samples for computing Matrix B are printed on a 600 dpi printer and scanned at 300 dpi. But different printing and scanning resolutions may not affect the training.

The results of testing the handwriting separation method of the present invention are shown in FIGS. 9–11. All of the original documents were printed at 600 dpi and scanned at 300 dpi. The handwritten annotations were made using a medium point ballpoint pen. FIG. 9 is a document 900 having a combination of handwritten annotations and machine printed text. FIG. 10 shows a processed version 910 of document 900 of FIG. 9 which demonstrates the results of the word segmentation step and subsequent classification step results in identifying the machine printed text graphically by the bounding boxes overlaid on the original document contents (e.g., box 915). FIG. 11 shows a processed version 920 of document 900 of FIG. 9 which demonstrates the results of the word segmentation step and subsequent classification step results in identifying the handwritten annotations graphically by the bounding boxes overlaid on the original document contents (e.g., box 925). As demonstrated by FIGS. 9–11, the method of the present invention is capable of identifying handwritten annotations even when directly overlaid over machine printed text.

In the preferred embodiment of the handwriting separation method of the present invention, the classification step is performed on a word-by-word basis, and is thus robust and efficient in terms of processing time. Further, this method does not require global information of the contents of a page, and can operate even when the machine printed text varies in font style and size and the handwriting appears anywhere on within document.

Various applications exist for the method of the present invention, which detects handwritten annotations on a document consisting of machine printed text and such annotations. One such application is document recognition. The handwritten annotations and machine printed text within the same document are separated and passed to appropriate recognition engines such as OCR for the machine printed text and ICR for the handwritten annotations, for efficient recognition. Another application for the separation of handwritten annotations is form processing and bank check processing where only the handwritten annotation is of interest. Other applications include automatic version control where changes made to the original document are tracked, the secure transmission and printing of original document content, and efficient archiving of documents based on document content, in which original content is stored initially and only incremental changes to the document (such as add-on handwritten annotations) are saved thereafter.

While the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A system for printing documents, comprising:

means for generating digital documents having handwritten text and machine printed text and for generating a request to print at least one of said digital documents;

an intelligent printing control interface coupled to receive and selectively process said request to remove said handwritten text, said intelligent printing control interface comprising a virtual printer driver for receiving said request, a printing control panel for determining whether to process said request, and a handwriting separation module for selectively processing said request, under control of said printing control panel, to remove said handwritten text; and means coupled to said intelligent printing control interface for printing said selectively processed request;

wherein said handwriting separation module processes said request by segmenting the digital image into a plurality of text blocks, computing an observation sequence for each of said text blocks, computing a first probability for each of said text blocks that said observation sequence would appear in a predetermined Hidden Markov Model for machine printed text, computing a second probability for each of said text blocks that said observation sequence would appear in a predetermined Hidden Markov Model for handwritten text, comparing said first probability and said second probability for each of said text blocks, marking said text block as machine printed text if said first probability is greater than said second probability, marking said text block as handwritten text if said second probability is greater than said first probability, and removing said marked handwritten text.

2. A system for copying documents, comprising:

a scanner for generating a digital document having handwritten text and machine printed text and for generating a request to print said digital document;

an intelligent printing control interface coupled to receive and selectively processes said request to remove said handwritten text, said intelligent printing control interface comprising a virtual printer driver for receiving said request, a printing control panel for determining whether to process said request, and a handwriting separation module for selectively processing said request, under control of said printing control panel, to remove said handwritten text; and a printer coupled to said intelligent printing control interface for printing said selectively processed request;

wherein said handwriting separation module processes said request by segmenting the digital image into a plurality of text blocks, computing an observation sequence for each of said text blocks, computing a first probability for each of said text blocks that said observation sequence would appear in a predetermined Hidden Markov Model for machine printed text, computing a second probability for each of said text blocks that said observation sequence would appear in a predetermined Hidden Markov Model for handwritten text, comparing said first probability and said second probability for each of said text blocks, marking said text block as machine printed text if said first probability is greater than said second probability, marking said text block as handwritten text if said second probability is greater than said first probability, and removing said marked handwritten text.

3. A method of separating handwritten text from machine printed text in a digital image containing a mixture of handwritten text and machine printed text, comprising the steps of:

A. segmenting the digital image into a plurality of text blocks;

B. computing an observation sequence for each of said text blocks;

C. computing a first probability for each of said text blocks that said observation sequence would appear in a predetermined Hidden Markov Model for machine printed text;

D. computing a second probability for each of said text blocks that said observation sequence would appear in a predetermined Hidden Markov Model for handwritten text;

E. comparing said first probability and said second probability for each of said text blocks;

F. marking said text block as machine printed text if said first probability is greater than said second probability; and G. marking said text block as handwritten text if said second probability is greater than said first probability.

4. The method of claim 3, further comprising the step of post-processing the digital image after each of said text blocks are marked as either machine printed text or handwritten text to correct single errors.

5. The method of claim 3, wherein said segmenting step comprises the steps of:

generating connecting components within the digital image; and grouping said connected components into a plurality of text blocks.

6. The method of claim 5, wherein said grouping step comprises the steps of:

determining if each pair of neighboring connected components are on the same line;

for a given pair of neighboring connected components on the same line, determining if said pair of neighboring connected components are adjacent to each other;

for a given pair of neighboring connected components adjacent to each other, determining if said pair of neighboring connected components have the same height; and if said pair of neighboring connected components have the same height, merging said pair of neighboring connected components together into a single text block.

7. The method of claim 6, wherein said step of determining if said pair of neighboring connected components are on the same line comprises the steps of:

identifying minimum vertical coordinates for each of said pair of connected components;

determining if the difference between said minimum vertical coordinates of said neighboring connected components is less than a first predetermined threshold determining; and when the difference between said minimum vertical coordinates of said neighboring connected components is less than a first predetermined threshold determining, marking said pair of connected components as being on the same line.

8. The method of claim 6, wherein said step of determining if said pair of neighboring connected components are adjacent to each other further comprises the steps of:

identifying maximum and minimum horizontal coordinates for each of said neighboring connected components;

determining if the difference between said maximum horizontal coordinate of a first of said neighboring connected components and said minimum horizontal coordinate of a second of said neighboring connected components is less than a second predetermined threshold;

determining if the difference between said maximum horizontal coordinate of said second of said neighboring connected components and said minimum horizontal coordinate of said first of said neighboring connected components is less than said second predetermined threshold; and when the difference between said maximum horizontal coordinate of said first of said neighboring connected components and said minimum horizontal coordinate of said second of said neighboring connected components is less than said second predetermined threshold or when the difference between said maximum horizontal coordinate of said second of said neighboring connected components and said minimum horizontal coordinate of said first of said neighboring connected components is less than said second predetermined threshold, marking said pair of connected components as being adjacent to each other.

9. The method of claim 6, wherein said step of determining if said pair of neighboring connected components have the same height further comprises the steps of:

identifying maximum and minimum vertical coordinates for each of said neighboring connected components;

determining the difference between the maximum and minimum vertical coordinate of a first of said neighboring connected components less the difference between the maximum and minimum coordinates of a second of said neighboring connected components is less than a third predetermined threshold; and when the difference between the maximum and minimum vertical coordinate of said first of said neighboring connected components less the difference between the maximum and minimum coordinates of said second of said neighboring connected components is less than a third predetermined threshold, marking said pair of connected components as having the same height.

10. A method for copying and printing documents, comprising the steps of:

generating a digital image of a document having both handwritten text and machine printed text;

generating a request to print said digital image;

processing said request to selectively remove said handwritten text, said step of processing said request further comprises the steps of:

A. segmenting said digital image into a plurality of text blocks;

B. computing an observation sequence for each of said text blocks;

C. computing a first probability for each of said text blocks that said observation sequence would appear in a predetermined Hidden Markov Model for machine printed text;
D. computing a second probability for each of said text blocks that said observation sequence would appear in a predetermined Hidden Markov Model for handwritten text;
E. comparing said first probability and said second probability for each of said text blocks;
F. marking said text block as machine printed text if said first probability is greater than said second probability; and
G. marking said text block as handwritten text if said second probability is greater than said first probability; and transmitting said selectively processed request to a printer for printing thereof.

* * * * *